(12) United States Patent
Imanishi

(10) Patent No.: US 11,476,479 B2
(45) Date of Patent: Oct. 18, 2022

(54) FUEL CELL SYSTEM AND METHOD FOR DETERMINING FUEL CELL STACK REUSABILITY

(71) Applicant: TOYOTA JIDOSHA KABUSHIKI KAISHA, Toyota (JP)

(72) Inventor: Masahiro Imanishi, Gotemba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 63 days.

(21) Appl. No.: 17/231,248

(22) Filed: Apr. 15, 2021

(65) Prior Publication Data

US 2021/0336281 A1   Oct. 28, 2021

(30) Foreign Application Priority Data

Apr. 22, 2020   (JP) .............................. JP2020-075970

(51) Int. Cl.
*H01M 8/04302*   (2016.01)
*H01M 8/04992*   (2016.01)
*H01M 8/04537*   (2016.01)

(52) U.S. Cl.
CPC ... *H01M 8/04302* (2016.02); *H01M 8/04567* (2013.01); *H01M 8/04992* (2013.01); *H01M 2250/20* (2013.01)

(58) Field of Classification Search
CPC ......... H01M 8/04302; H01M 8/04589; H01M 8/04686; H01M 8/04679; H01M 8/04992
See application file for complete search history.

(56) References Cited

FOREIGN PATENT DOCUMENTS

| JP | 2007-128769 | * | 5/2007 |
|---|---|---|---|
| JP | 2007-128769 A | | 5/2007 |
| JP | 2008-097836 | * | 4/2008 |
| JP | 2008-097836 A | | 4/2008 |
| JP | 2018-078025 A | | 5/2018 |

* cited by examiner

*Primary Examiner* — Brittany L Raymond
(74) *Attorney, Agent, or Firm* — Finnegan, Henderson, Farabow, Garrett & Dunner, LLP

(57) ABSTRACT

The fuel cell system is a fuel cell system comprising a fuel cell stack assembly, wherein the fuel cell stack assembly comprises a fuel cell stack and a data storage configured to store a start-up history of the fuel cell stack; wherein the data storage comprises a detector configured to detect a presence or absence of a connection to at least one selected from the group consisting of an external power source and an external communication device; and wherein the data storage starts up when a voltage of the fuel cell stack is a predetermined threshold value or more.

5 Claims, 1 Drawing Sheet

FUEL CELL SYSTEM AND METHOD FOR DETERMINING FUEL CELL STACK REUSABILITY

TECHNICAL FIELD

The disclosure relates to a fuel cell system and a method for determining fuel cell stack reusability.

BACKGROUND

A fuel cell (FC) is a power generation device that generates electrical energy by electrochemical reaction between hydrogen ($H_2$), which serves as fuel gas, and oxygen ($O_2$), which serves as oxidant gas, in a fuel cell stack (hereinafter, it may be simply referred to as "stack") composed of stacked unit fuel cells (hereinafter, it may be referred to as "cells"). Hereinafter, fuel gas and oxidant gas may be collectively and simply referred to as "reaction gas" or "gas".

In general, the unit fuel cells are composed of a membrane electrode assembly (MEA) and, as needed, two separators sandwiching the membrane electrode assembly.

The membrane electrode assembly has such a structure, that a catalyst layer and a gas diffusion layer are formed in this order on both surfaces of a solid polymer electrolyte membrane having proton ($H^+$) conductivity (hereinafter, it may be simply referred to as "electrolyte membrane").

In general, the separators have such a structure that a groove is formed as a reaction gas flow path on a surface in contact with the gas diffusion layer. The separators function as a collector of generated electricity.

In the fuel electrode (anode) of the fuel cell, the hydrogen supplied from the flow path and the gas diffusion layer is protonated by the catalytic activity of the catalyst layer, and the protonated hydrogen goes to the oxidant electrode (cathode) through the electrolyte membrane. An electron is generated at the same time, and it passes through an external circuit, do work, and then goes to the cathode. The oxygen supplied to the cathode reacts with the proton and electron on the cathode, thereby generating water.

The generated water provides the electrolyte membrane with appropriate moisture. Redundant water penetrates the gas diffusion layer and then is discharged to the outside of the system.

Once the stack is sold, the reuse value of the stack (especially the used stack) largely depends on the remaining life of the stack.

For example, Patent Literature 1 discloses such a fuel cell lifetime evaluation technique, that a fuel cell includes a storing means for storing its own operation history data, stores the operation history data in the storing means, and diagnoses the lifetime of the fuel cell based on the stored operation history data.

Patent Literature 2 discloses a cell life determination device for appropriately determining the life of a unit fuel cell.

Patent Literature 3 discloses an electric vehicle which can easily obtain a determination result on whether or not a collected battery pack is reusable.

Patent Literature 1: Japanese Patent Application Laid-Open (JP-A) No. 2007-128769
Patent Literature 2: JP-A No. 2008-097836
Patent Literature 3: JP-A No. 2018-078025

To correctly judge the remaining life of a stack, it is needed to accurately trace the history of the stack. To accurately trace the history, the stack is needed to be in any of the following states, for example: the state where the stack is kept mounted on a fuel cell vehicle (hereinafter, it may be referred to as "vehicle"); the state where, even when the stack is dismounted from the vehicle, the stack is dismounted by predetermined correct procedures; and the state where the stack is stored by a predetermined storage method.

The lifetime diagnosis disclosed in Patent Literature 1 is directed to the stack kept mounted on a vehicle.

In the conventional art, accordingly, only the operation history of the stack mounted on the vehicle is recorded. Also in the conventional art, there is no record of the history of whether or not the stack was dismounted from the vehicle by correct procedures and whether or not the stack generated electricity after it was dismounted from the vehicle. Also in the conventional art, the abnormal potential phenomenon which is specific to the fuel cell, is not detected. Also in the conventional art, there is no data storage for detecting the abnormal potential phenomenon which is caused after the fuel cell is dismounted from the vehicle.

The stack is expected to be dismounted from the fuel cell vehicle when a user uses the vehicle or when the stack is sold.

When the stack is dismounted from the vehicle by unspecified incorrect procedures or when the dismounted stack is caused to generate electricity, the stack is subjected to an abnormally high voltage and results in catalyst deterioration and a negative influence on the lifetime of the stack.

Even when the stack is used in a correct manner, it is inevitable for the stack to be subjected to a high voltage, and the deterioration of the catalyst proceeds, accordingly. In this case, however, since the stack is under the observation of the fuel cell system, the history can be accurately traced, and the reliability of the diagnosis of the remaining life of the stack is ensured. In contrast, when the stack is used in an incorrect manner, the stack is not under the observation of the fuel cell system. Accordingly, the subsequent history cannot be accurately traced, and there is a decrease in the reliability of the diagnosis of the remaining life of the stack.

SUMMARY

The disclosed embodiments were achieved in light of the above circumstances. An object of the disclosed embodiments is to provide such a fuel cell system, that its stack can be easily checked and determined whether or not it has a value as, when distributed to the reuse market, a stack having a remaining life. Another object of the disclosed embodiments is to provide a method for determining fuel cell stack reusability.

In a first embodiment, there is provided a fuel cell system comprising a fuel cell stack assembly,
wherein the fuel cell stack assembly comprises a fuel cell stack and a data storage configured to store a start-up history of the fuel cell stack;
wherein the data storage comprises a detector configured to detect a presence or absence of a connection to at least one selected from the group consisting of an external power source and an external communication device;
wherein the data storage starts up when a voltage of the fuel cell stack is a predetermined threshold value or more;
wherein, at the time of starting up the data storage, the data storage records the start-up as a normal start-up of the fuel cell stack when the detector detects the presence of the connection; and wherein, at the time of starting up the data storage, the data storage records the start-up as an abnormal start-up of the fuel cell stack when the detector detects the absence of the connection.

The threshold value may be a predetermined voltage at which a catalyst of the fuel cell stack deteriorates.

The data storage may start up using the fuel cell stack as a power source.

The fuel cell stack assembly may further comprise an internal power source, and the data storage may start up using the internal power source as a power source.

In another embodiment, there is provided a method for determining fuel cell stack reusability, wherein, for the above-described fuel cell system, the fuel cell stack of the fuel cell system is determined to be non-reusable when at least one abnormal start-up record is included in the stored start-up history.

According to the disclosed embodiments, such a fuel cell system can be provided, that its stack can be easily checked and determined whether or not it has a value as, when distributed to the reuse market, a stack having a remaining life.

BRIEF DESCRIPTION OF THE DRAWINGS

In the accompanying drawings.

DETAILED DESCRIPTION

Figure 1:
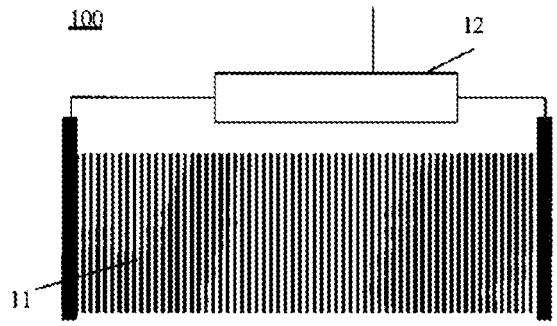
FIG. 1 is a view of an example of the structure of the fuel cell stack assembly according to the disclosed embodiments.

The fuel cell system of the disclosed embodiments is a fuel cell system comprising a fuel cell stack assembly, wherein the fuel cell stack assembly comprises a fuel cell stack and a data storage configured to store a start-up history of the fuel cell stack;

wherein the data storage comprises a detector configured to detect a presence or absence of a connection to at least one selected from the group consisting of an external power source and an external communication device;

wherein the data storage starts up when a voltage of the fuel cell stack is a predetermined threshold value or more;

wherein, at the time of starting up the data storage, the data storage records the start-up as a normal start-up of the fuel cell stack when the detector detects the presence of the connection; and wherein, at the time of starting up the data storage, the data storage records the start-up as an abnormal start-up of the fuel cell stack when the detector detects the absence of the connection.

When the stack is mounted on a vehicle, the stack is generally under the control of the fuel cell system. Accordingly, there is no unexpected gas input/output, and an abnormal potential is not generated in the anode. When the stack is dismounted from the vehicle by predetermined correct procedures, an abnormal potential is not generated in the anode.

If the stack is dismounted from the vehicle by incorrect procedures or the dismounted stack is caused to generate electricity, due to an abnormal potential generated in the anode, an abnormal voltage is generated in the stack and results in a deterioration in the catalyst and a reduction in the performance of the stack. Accordingly, the remaining life of the stack cannot be correctly estimated. To increase the reliability of the determination of the reusability of the dismounted stack, accordingly, it is needed to ensure that the stack was handled by a predetermined correct method. In the conventional art, however, there is no method for recording the history of the stack in the moment of being dismounted from the vehicle and after it is dismounted from the vehicle.

The abnormal state of the stack may be as follows, for example: the state where a voltage is generated in the stack that is not mounted in the vehicle, the state where the stack is not dismounted from the vehicle by predetermined correct procedures, and the state where the stack is not stored by a predetermined correct method.

In the case where a voltage is generated in the stack that is not mounted in the vehicle, there is the following possibility: since the stack is not under the control of the fuel cell system, due to unexpected gas input/output, an abnormal potential was generated in the anode, and the catalyst deteriorated.

In the case where the stack is not dismounted from the vehicle by predetermined correct procedures, there is a possibility such that an abnormal potential is generated in the anode by unexpected gas input/output, and the catalyst deteriorates.

In addition, in the case where the stack is stored without hermetically capping the manifold of the stack, there is a possibility such that an abnormal potential is generated in the anode by unexpected gas input/output, and the catalyst deteriorates.

When the stack is caused to generate electricity by itself, it is not possible to trace the history of how the stack was started and operated.

Due to the reasons mentioned above, it can be said that a voltage is generated in the normal state only when the stack is mounted in the vehicle. In addition, as long as the stack is mounted in the vehicle, there is always a connection to a predetermined external power source (such as a power source with a voltage of 12 V), external communication device, etc. Accordingly, the voltage of the stack can be determined as a normal or abnormal voltage by the presence or absence of a connection to a predetermined external voltage, external communication device, etc.

According to the disclosed embodiments, the data storage, which operates without a power supply from the outside, is built into the fuel cell stack assembly, and the data storage detects an abnormal voltage in the stack and records the start-up history such as time and date. Accordingly, the presence or absence of the generation of an abnormal voltage in the stack in the moment of being dismounted from the vehicle and after it is dismounted from the vehicle, can be recorded.

In particular, when an abnormal voltage is generated in the stack and the stack has no connection to the predetermined external power source, external communication device, etc., the data storage considers it as an abnormal case and sets a flag. Accordingly, the stack can be easily checked and determined whether or not it has a value as, when distributed to the reuse market, a stack having a remaining life (a reusable stack).

As the predetermined correct procedures for dismounting the stack from the vehicle, examples include, but are not limited to, the following procedures (1) to (4):

(1) After the ignition (IG) of the vehicle is turned off, the stack is left to stand for a predetermined time (to consume oxygen in the cathode and decrease the stack voltage).

(2) Hydrogen remaining in the anode is removed from the anode, and reaction gas in the anode and the cathode is replaced with nitrogen.

(3) Air is introduced into the anode and cathode at a time, at a predetermined flow rate (an abnormal voltage is not generated in the stack, as long as fuel gas is again introduced into the anode at this point).

(4) Piping is detached from the stack, and the manifold of the stack is capped, and the stack is dismounted from the vehicle.

As the predetermined correct method for storing the stack, examples include, but are not limited to, the following storage methods (A) and (B).

(A) The manifold of the stack is capped and stored preventing it from the incorporation of foreign substances and poisoning gas (especially sulfide-based gas).

(B) The stack is stored preventing it from the generation of electricity by itself.

FIG. 1 is a view of an example of the structure of the fuel cell stack assembly according to the disclosed embodiments.

A fuel cell stack assembly 100 shown in FIG. 1 includes a fuel cell stack 11 and a data storage 12. The data storage 12 is configured to be able to connect to an external power source, etc.

The fuel cell system of the disclosed embodiments comprises at least the fuel cell stack assembly.

The fuel cell stack assembly comprises the fuel cell stack and the data storage configured to store the start-up history of the fuel cell stack.

The fuel cell stack is composed of stacked unit fuel cells.

The number of the stacked unit fuel cells is not particularly limited. For example, two to several hundred unit fuel cells may be stacked, or 2 to 200 unit fuel cells may be stacked.

The fuel cell stack may include an end plate at both stacking-direction ends of each unit fuel cell.

Each unit fuel cell includes at least a membrane electrode assembly including an oxidant electrode, an electrolyte membrane and a fuel electrode. As needed, it may include two separators sandwiching the membrane electrode assembly.

The separators may have a reaction gas flow path on a surface in contact with a gas diffusion layer. Also, on an opposite surface to the surface in contact with the gas diffusion layer, the separators may have a refrigerant flow path for keeping the fuel cell temperature at a constant level.

The separators may have supply and discharge holes for delivering reaction gas and refrigerant in the unit cell stacking direction.

As the supply hole, examples include, but are not limited to, a fuel gas supply hole, an oxidant gas supply hole and a refrigerant supply hole.

As the discharge hole, example include, but are not limited to, a fuel gas discharge hole, an oxidant gas discharge hole and a refrigerant discharge hole.

The separators may be a gas-impermeable, electroconductive member, etc. As the electroconductive member, examples include, but are not limited to, gas-impermeable dense carbon obtained by carbon densification, and a metal plate obtained by press molding. The separators may have a current collection function.

The fuel cell stack may have a manifold such as an inlet manifold communicating between the supply holes and an outlet manifold communicating between the discharge holes.

As the inlet manifold, examples include, but are not limited to, an anode inlet manifold, a cathode inlet manifold and a refrigerant inlet manifold.

As the outlet manifold, examples include, but are not limited to, an anode outlet manifold, a cathode outlet manifold and a refrigerant outlet manifold.

The oxidant electrode includes an oxidant electrode catalyst layer and a gas diffusion layer.

The fuel electrode includes a fuel electrode catalyst layer and a gas diffusion layer.

The oxidant electrode catalyst layer and the fuel electrode catalyst layer may contain a catalyst metal for accelerating an electrochemical reaction, a proton-conducting electrolyte, or electron-conducting carbon particles, for example.

As the catalyst metal, for example, platinum (Pt) or an alloy of Pt and another metal (such as Pt alloy mixed with cobalt, nickel or the like) may be used.

The electrolyte may be fluorine resin or the like. As the fluorine resin, for example, a Nafion solution may be used.

The catalyst metal is supported on carbon particles. In each catalyst layer, the carbon particles supporting the catalyst metal (i.e., catalyst particles) and the electrolyte may be mixed.

As the carbon particles for supporting the catalyst metal (i.e., supporting carbon particles), for example, water repellent carbon particles obtained by enhancing the water repellency of commercially-available carbon particles (carbon powder) by heating, may be used.

The gas diffusion layer may be a gas-permeable, electroconductive member or the like.

As the electroconductive member, examples include, but are not limited to, a porous carbon material such as carbon cloth and carbon paper, and a porous metal material such as metal mesh and foam metal.

The electrolyte membrane may be a solid polymer electrolyte membrane. As the solid polymer electrolyte membrane, examples include, but are not limited to, a hydrocarbon electrolyte membrane and a fluorine electrolyte membrane such as a moisture-containing, thin perfluorosulfonic acid membrane. The electrolyte membrane may be a Nafion membrane (manufactured by DuPont), for example.

The data storage stores the start-up history of the fuel cell stack.

The start-up history of the fuel cell stack may be the history of the record of an increase in the voltage of the fuel cell stack to the predetermined threshold value or more.

The start-up history may be an operation history.

The operation history may be the history of the record of a period between an increase in the voltage of the fuel cell stack to the predetermined threshold value or more and a decrease in the voltage of the fuel cell stack to the predetermined voltage or less.

The data storage may start up using, for example, electrical power from the fuel cell stack used as the power source.

The fuel cell stack assembly may further comprise an internal power source, and the data storage may start up using the internal power source as the power source. A real-time clock that is operated by the internal power source, may be mounted on the fuel cell stack assembly to record time and date as the start-up history of the stack.

As the internal power source, examples include, but are not limited to, a conventionally-known primary battery and a conventionally-known secondary battery.

The data storage comprises a detector configured to detect the presence or absence of a connection to at least one selected from the group consisting of an external power source and an external communication device.

The stack is, when mounted on the vehicle, connected to the external power source, the external communication device, etc., whereby the detector can detect that the stack is connected to the external power source, the external communication device (such as a controller area network (CAN)), etc. On the other hand, the stack is, when not mounted on the vehicle, not connected to the external power source, the external communication device, etc., whereby the detector can detect that the stack is not connected to the external power source, the external communication device, etc.

The connection detected by the detector may be a connection to any one of the external power source and the external communication device, or it may be a connection to both of them.

The data storage physically includes a processing unit such as a central processing unit (CPU), a memory device such as a read-only memory (ROM) and a random access memory (RAM), and an input-output interface, for example. The ROM is used to store a control program, control data and so on processed by the processing unit, and the RAM is mainly used as various workspaces for control processes. Also, the data storage may be a control device such as an engine control unit (ECU).

The detector may be a conventionally-known connection detection sensor, for example.

The data storage starts up when the voltage of the fuel cell stack is a predetermined threshold value or more.

For example, the data storage may record, as the start-up history, the time and date of when the voltage of the fuel cell stack increased to the predetermined threshold value or more. Also, the data storage may record, for example, the time and date of when the voltage of the fuel cell stack increased to the predetermined threshold value or more and the time and date of when the voltage decreased to the predetermined voltage or less, and the data storage may record them as the operation history of the stack.

At the time of starting up the data storage, the data storage records the start-up as a normal start-up of the fuel cell stack when the detector detects the presence of a connection to the external power source, external communication device, etc.

Meanwhile, at the time of starting up the data storage, the data storage records the start-up as an abnormal start-up of the fuel cell stack when the detector detects the absence of a connection to the external power source, external communication device, etc.

The fuel cell stack can be determined to be non-reusable when the abnormal start-up record is recorded in the data storage.

The predetermined threshold value of the voltage of the fuel cell stack is not particularly limited. For example, it may be a predetermined voltage at which the catalyst of the fuel cell stack deteriorates. Since the catalyst deterioration voltage varies depending on the type of the catalyst, the voltage may be appropriately determined depending on the used catalyst.

Figure 2:
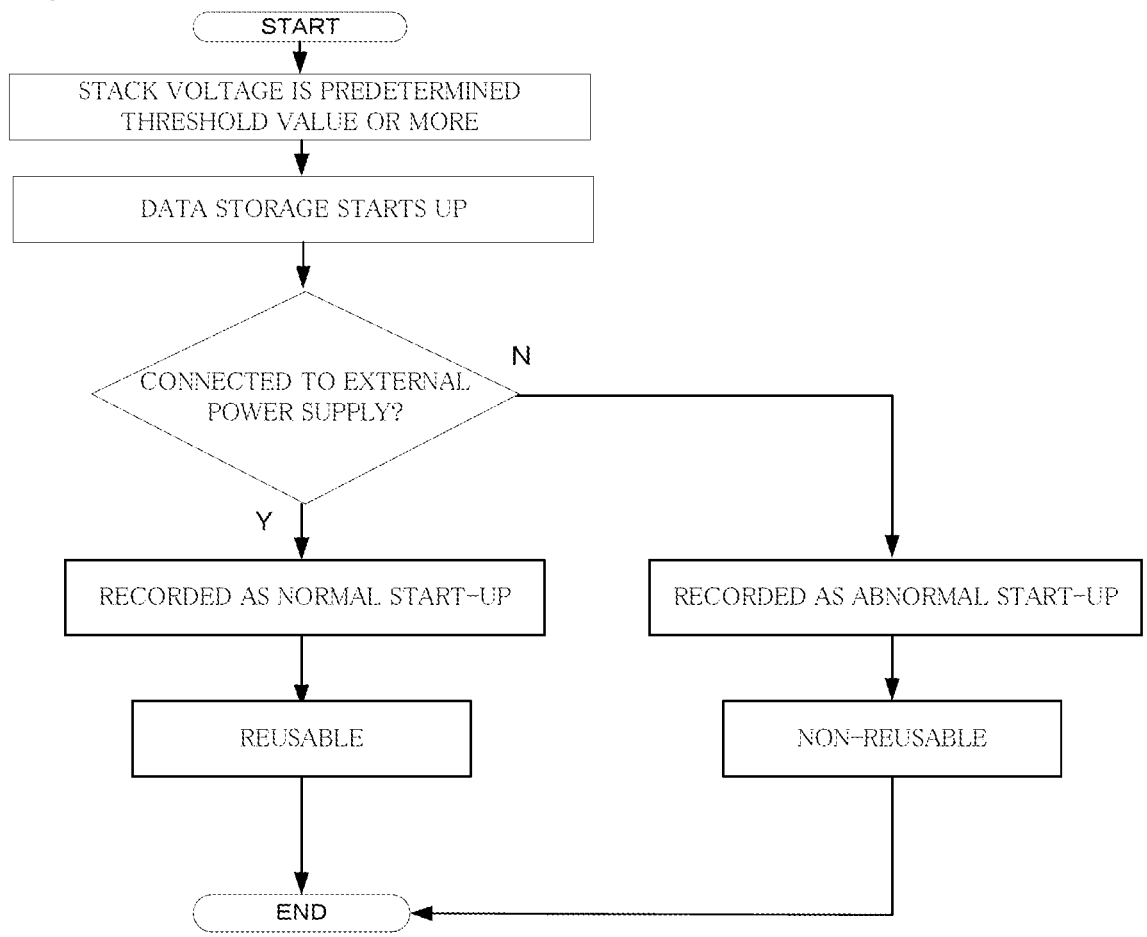
FIG. 2 is the flow chart of an example of the method for determining fuel cell stack reusability according to the disclosed embodiments.

FIG. 2 is the flow chart of an example of the method for determining fuel cell stack reusability according to the disclosed embodiments. The disclosed embodiments are not limited to this typical example.

First, the data storage starts up when the voltage of the fuel cell stack is the predetermined threshold value or more.

Next, the detector detects the presence or absence of a connection to the external power source.

Next, the data storage records the start-up as a normal start-up of the fuel cell stack when the detector detects the presence of a connection to the external power source.

On the other hand, the data storage records the start-up as an abnormal start-up of the fuel cell stack when the detector detects the absence of a connection to the external power source.

The fuel cell stack is determined to be reusable when a single abnormal start-up record is not included in the start-up history stored in the data storage.

On the other hand, the fuel cell stack is determined to be non-reusable when at least one abnormal start-up record is included in the start-up history stored in the data storage.

REFERENCE SIGNS LIST

11. Fuel cell stack
12. Data storage
100. Fuel cell stack assembly

The invention claimed is:

1. A fuel cell system comprising a fuel cell stack assembly,
    wherein the fuel cell stack assembly comprises a fuel cell stack and a data storage configured to store a start-up history of the fuel cell stack;
    wherein the data storage comprises a detector configured to detect a presence or absence of a connection to at least one selected from the group consisting of an external power source and an external communication device;
    wherein the data storage starts up when a voltage of the fuel cell stack is a predetermined threshold value or more;
    wherein, at the time of starting up the data storage, the data storage records the start-up as a normal start-up of the fuel cell stack when the detector detects the presence of the connection; and
    wherein, at the time of starting up the data storage, the data storage records the start-up as an abnormal start-up of the fuel cell stack when the detector detects the absence of the connection.

2. The fuel cell system according to claim 1, wherein the threshold value is a predetermined voltage at which a catalyst of the fuel cell stack deteriorates.

3. The fuel cell system according to claim 1, wherein the data storage starts up using the fuel cell stack as a power source.

4. The fuel cell system according to claim 1,
    wherein the fuel cell stack assembly further comprises an internal power source, and
    wherein the data storage starts up using the internal power source as a power source.

5. A method for determining fuel cell stack reusability,
    wherein, for the fuel cell system defined by claim 1, the fuel cell stack of the fuel cell system is determined to be non-reusable when at least one abnormal start-up record is included in the stored start-up history.

* * * * *